(12) United States Patent
Ogata et al.

(10) Patent No.: US 6,170,150 B1
(45) Date of Patent: *Jan. 9, 2001

(54) METHOD FOR PRODUCING MAGNETIC HEAD

(75) Inventors: Seiichi Ogata; Tadashi Saito; Kazuhiro Hoshi, all of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/873,103

(22) Filed: Jun. 11, 1997

(30) Foreign Application Priority Data

Jun. 13, 1996 (JP) .................................................. 8-152535

(51) Int. Cl.[7] .................................................. G11B 5/127
(52) U.S. Cl. .................. 29/603.2; 29/603.21; 29/603.12; 360/125
(58) Field of Search ............................ 29/603.01, 603.07, 29/603.16, 603.2, 603.21, 603.12; 360/122, 125

(56) References Cited

U.S. PATENT DOCUMENTS

| | | | |
|---|---|---|---|
| 3,927,470 | * 12/1975 | Case | 29/603.2 |
| 5,276,959 | * 1/1994 | Yamamoto | 360/125 |
| 5,298,113 | * 3/1994 | Matsuzawa et al. | 29/603.01 |
| 5,519,556 | * 5/1996 | Saito et al. | 360/125 |
| 5,640,291 | * 6/1997 | Sato et al. | 360/125 |
| 5,718,036 | * 2/1998 | Oji et al. | 29/603.12 |

FOREIGN PATENT DOCUMENTS

| | | | |
|---|---|---|---|
| 14313 | * 1/1987 | (JP) | 29/603.01 |
| 100602 | * 5/1988 | (JP) | 29/603.01 |
| 1091311 | * 4/1989 | (JP) | 29/603.01 |

* cited by examiner

Primary Examiner—Lee Young
Assistant Examiner—A. Dexter Tugbang
(74) Attorney, Agent, or Firm—Sonnenschein, Nath & Rosenthal

(57) ABSTRACT

A method for producing a magnetic head with reduced cross talk. A position of a projection for forming a magnetic gap on each of two magnetic core half bodies is adjusted by forming first and second position adjusting projections for having sidewall surfaces that are vertical relative to surfaces for forming track width adjusting grooves.

6 Claims, 11 Drawing Sheets

METHOD FOR PRODUCING MAGNETIC HEAD

BACKGROUND OF THE INVENTION

1. Field of the Invention

The present invention relates to a method for producing a magnetic head for a magnetic recording and playback device with which it is possible to record with high density, for example, a video tape recorder (VTR) an da digital audio tape recorder (R-DAT) and so on.

2. Description of the Prior Art

For example, in order to record with high density, it is necessary to make track patterns recorded on magnetic recording medial small. As a method for it, there is the so-called guard bandless recording method in which recording takes place without providing a guard band.

However, as there is no guard band between tracks in the guard bandless recording method, so-called adjacent cross talk which is caused when a magnetic head traces (playbacks) a signal of an adjacent recording track.

Referring to a magnetic head loaded into a home VTR, as shown in FIG. 2, this magnetic head is usually used for both recording and playback, thus, head width (width of a gap) HW of a playback head is formed larger than a recording track pitch in order to ensure compatibility of playback.

Therefore, in case of playback of a recording pattern without a guard band by the magnetic head loaded to the home VTR, an overlap portion G1 of the magnetic gap occurs picks up a signal of a recording track TB adjacent a track TA and the adjacent cross talk is caused.

In a conventional magnetic head, in playing back of an azimuth recorded signal in case of, for example, the home digital VTR, obtained error rates varied from – one figure to + figure even if the playback C/N had been fixed, and the magnetic recording and playback device such as the home digital VTR to which the magnetic head was loaded at the lower limit of variation had to be designed.

Further, the conventional magnetic head had a problem that it was not possible to obtain the error rate enough to play back due to shortage of C/N in recording for a long time that, for example, standard tape feeding speed of the home VTR was two third of usual speed and video tape playback time was 1.5 times of usual time.

On the other hand, it is known that as a track pitch which is a pitch of a pattern recorded on a magnetic tape with high density recording, effect of the adjacent cross talk is larger and it causes degradation of S/N and the error rate.

Therefore, in order to control the effect of adjacent cross talk in playback of in the conventional magnetic head, it is considered that an angle of a track width adjusting groove is formed vertical to a surface opposite to a magnetic gap.

However, the magnetic head having the form is not preferable in point of recording and playback because a cross section of a magnetic core in the neighborhood of a magnetic gap.

Further, in a conventional method for producing the magnetic head, projections for forming the magnetic gap of a pair of magnetic core half bodies are not perfectly matched to both ends, and displacement of the ends of the projections for forming the magnetic gap of a pair of magnetic core half bodies occurs. Though it is known that this displace causes the adjacent cross talk, it is not clear that relation between the displacement and the adjacent cross talk.

Therefore, by forming, for example, the angle of the track width adjusting groove large, that is to say, the V-type groove of a large angle, it is considered to match to the both ends of the projection for forming the magnetic gap of a pair of magnetic core half bodies as perfectly as possible.

However, when making the angle of the track width adjusting groove large, the method for producing the conventional magnetic head had a problem that process yield was remarkably degradated to match the magnetic gap only at the edge of the track width adjusting groove.

The present invention was proposed considering the conventional technical problem and an object of the present invention is provide a magnetic head producing method for producing a magnetic head that is possible to control effect of adjacent cross talk less with the good process yield.

SUMMARY OF THE INVENTION

The inventors of the present invention studied in earnest for solving the foregoing problem, and as a result, found that it is possible to control the effect of adjacent cross talk by adjusting the amount of displacement and a direction of track width of a magnetic gap and a method for producing a magnetic head to make the amount of displacement and the direction of the track width of the magnetic gap fixed.

That is to say, though the inventors of the present invention obtained the results of the experiment, as shown in FIGS. 5 and 6, we examined the results of the experiment in detail and determined that is possible to realize the following action and effect.

First, in cases where displacement of the magnetic gap occurs, there are two cases. One of them, as shown in FIG. 4, is where the direction of the central line F caused by displacement of ends of projections for the magnetic gap of a pair of magnetic core half bodies is nearly in the direction of the azimuth angle of a recording track TA and an adjacent recording track TB, and the other, as shown in FIG. 3, is where the direction of the central line F caused by displacement of ends of projections for the magnetic gap of a pair of magnetic core half bodies is far from the direction of the azimuth angle of the recording track TA and the adjacent recording track TB.

The problem of the relation between the direction F of the bisector of an opening angle 0 by displacement G1 of the magnetic gap g and an angle of azimuth recording of the adjacent recording track, in the case of FIG. 3, "displacement of the magnetic gap in the positive direction," and in the case of FIG. 4, "displacement of the magnetic gap in the negative direction," is described next.

At the part G2 that head width (width of the gap) HW of a playback head is to the recording track TB, a signal of the track TA found by the normal magnetic gap is picked up, and a signal of the adjacent recording track TB is not picked up in order to scan the so-called reverse azimuth.

Examining the effect of the adjacent cross talk in both cases, in case of the displacement of the magnetic gap in the positive direction, as shown in FIG. 5, it is understood that the effect of the adjacent cross talk is small.

On the other hand, in case of the displacement of the magnetic gap in the negative direction, as shown in FIG. 6, it is understood that the effect of the adjacent cross talk is large.

Here, FIG. 5 and FIG. 6 are characteristic graph views showing how error rates are changed by the adjacent cross talk when the displacement of the magnetic gap occur. Further, FIG. 5 and FIG. 6 show when the azimuth angles of the magnetic head are +20 degree and −20 degree. Plots (vertical lines) as shown in FIG. 5 and FIG. 6 are results measured by whether there was the effect of the adjacent cross talk or not. The lower part of the vertical lines are the plots of the parts where there was no cross talk effect and the upper parts of the vertical lines are the plots of the parts where there was the effect of cross talk. Therefore, the shorter the length of the vertical lines is, the less the effect of the cross talk.

In adjacent pattern components picked up by the normal magnetic gap g, high frequency parts are controlled by azimuth loss, however, in the adjacent pattern by the displacement of the magnetic gap, it is almost impossible to expect azimuth loss in case of displacement of the magnetic gap in one direction. Actually, at high frequencies, there is the case that is 5 dB higher than amount of the displacement picked up from the normal magnetic gap. Therefore, in a system in which a low-pass component is not used for detecting a signal as, for example, as a signal of a partial response class 4, leakage from the adjacent track of comparatively high frequency can adversely affect detection of the signal.

As a result, though it is preferable to produce so that the displacement of the magnetic gap occurs in the positive direction or so that the displacement of the magnetic gap does not occur, when matching the magnetic gap with the direction of the displacement of the magnetic gap fixed according to the conventional method for producing the magnetic head, it is hard to adjust the amount of the displacement in the direction of track width of the magnetic gap and it is impossible to keep highly track accuracy.

SUMMARY OF THE INVENTION

Therefore, a method for producing a magnetic head of the present invention, in order to solve the problem, is characterized by the steps of joining and integrating a pair of magnetic core half bodies in which track width adjusting grooves are formed and in which projections for forming a magnetic gap are formed so that surfaces for forming the track width adjusting grooves are opposite each other, and forming the magnetic gap between matching surfaces of the projections for forming a magnetic gap, forming projections for adjusting positions both side surfaces of which are vertical to the surfaces for forming the track width adjusting grooves in forming the track width adjusting grooves; and adjusting the positions of the projections for forming the magnetic gap of each of magnetic core half bodies each other by adjusting the positions of the projections for adjusting the positions.

According to the method for producing the magnetic head of the present invention, a magnetic head with high accuracy is produced by forming projections for adjusting positions having side surfaces which are vertical to the surfaces for forming the track width adjusting grooves in forming the track width adjusting grooves and adjusting the positions the projections for forming the magnetic gap of each of magnetic core half bodies each other by adjusting the positions of the projections for adjusting the positions.

The magnetic head with the good matching accuracy that the displacement of the magnetic gap is fixed is produced by adding the displacement corresponding to differences of width of the projections for adjusting the positions at the matching positions of the projections for forming the magnetic gap of each of magnetic core half bodies by forming the plural projections for adjusting the positions that matching width is different at the fixed pitch and by adjusting the positions of the projections for adjusting the positions that matching width.

The magnetic head that is possible to control cross talk from an adjacent channel in playback is produced by adding the displacement so that in adding azimuth angles to the magnetic gap, the angle between the center line of the matching surface of the projections for forming the magnetic gap and the wall surfaces of the track width adjusting grooves which are opposite to them and the azimuth direction of the adjacent recording track is larger than the angle between the magnetic gap and the azimuth direction of the adjacent recording track.

These and other features of the invention are discussed in greater detail below in the following detailed description of the presently preferred embodiments with reference to the accompanying drawings.

DETAILED DESCRIPTION OF THE PREFERRED EMBODIMENTS

Concrete embodiments according to the present invention are described in detail below with reference to the drawings.

Embodiment 1

A present embodiment is that a magnetic gap part is applied to a Metal in Gap type magnetic head (which is called "the MIG head") to form by a metallic magnetic film.

Figure 7:
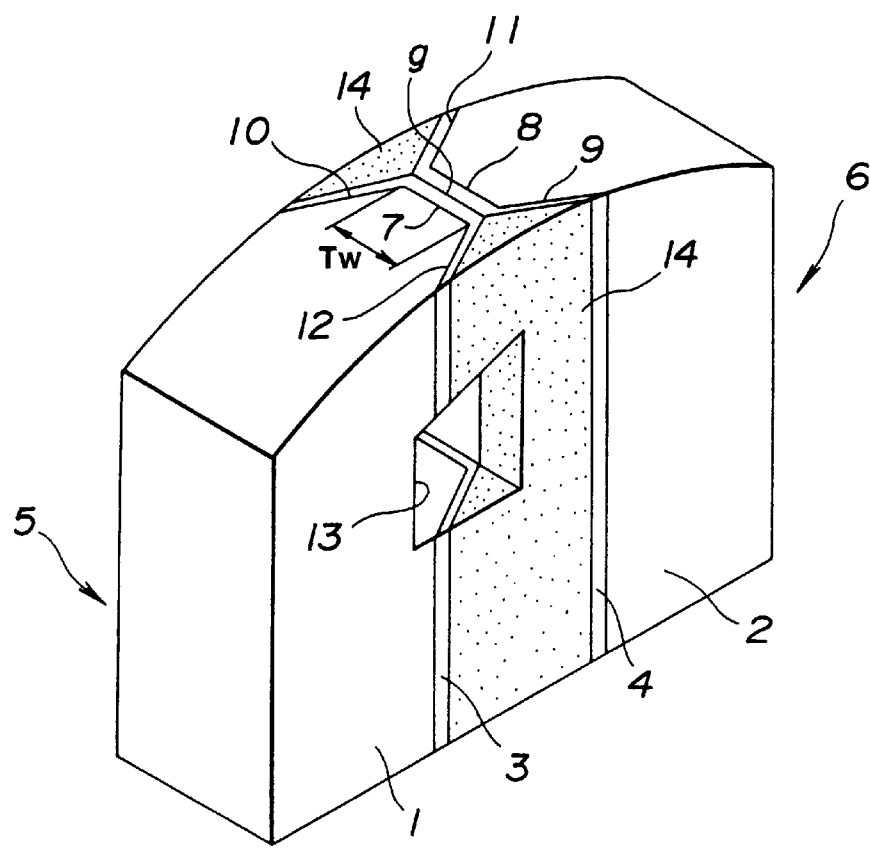
FIG. 7 is a perspective view showing an example of a magnetic head according to the present invention.

In the magnetic head according to the present embodiment, as shown in FIG. 7, a closed magnetic circuit is made up by a pair of magnetic core semiconductors 5 and 6 including magnetic core substrates 1 and 2 made of ferrite and metallic magnetic films 3 and 4 adhered onto the matching surfaces of the magnetic core substrates 1 and 2 respectively. A magnetic gap g at azimuth angles operating as a recording and playback gap is formed between the matching surfaces of the metallic magnetic films 3 and 4.

the magnetic core substrates 1 and 2 are made of oxide magnetic materials, for example, ferrite and so on, and function as assistant cores which back up the metallic magnetic films 3 and 4 so that the small core cross sections functioning as main cores are small. That is to say, playback output is prevented from degrading due to core volume of the magnetic core substrates 1 and 2 due to the small cross sections of the cores of the metallic magnetic films 3 and 4.

Further, in the magnetic core substrates 1 and 2, the sides of the matching surfaces are almost trapezoidal in plan view. That is to say, on the sides of the matching surfaces, gap forming surfaces 7 and 8 parallel to the magnetic gap g, triangular track width controlling grooves defined by surfaces 9, 10, 11 and 12 for controlling the track width To of the magnetic gap g are formed.

Still, a nonmagnetic material 14 such as glass is loaded into the track width controlling grooves for the purposes of securing working characteristic to the magnetic recording media and preventing biased abortion due to sliding contact in the track width adjusting surfaces 7, 8, 9 and 10.

Further, a winding groove 13, the cross section of which is almost a vertically inclined U-type, is formed for adjusting the depth of the magnetic gap g and for winding a coil (which is not shown) on the matching surface of a magnetic core substrate 1.

On one hand, the metallic magnetic films 3 and 4 are formed from the front to the back on the matching surfaces of the magnetic core substrates 1 and 2. That is to say, the metallic magnetic films 3 and 4 are formed from the front to the back on the track width control grooves surfaces 9, 10, 11 and 12 provided on the gap forming surfaces 7 and 8 of the magnetic core substrate 1 and 2 and on the side of edges of both ends of them.

Though a ferromagnetic material which has high saturation magnetic density and good soft magnetic characteristic is used for the metallic magnetic films 3 and 4, it is possible to use a crystal, amorphous or micro crystal material which have been known as usual as the ferromagnetic material.

For example, it is possible to use a Fe—Al—Si series alloy (Sendust), a Fe—Si—Co series alloy, a Fe—Ni series alloy, a Fe—Al—Ge series alloy, a Fe—Ga—Ge series alloy, a Fe—Si—Ge series alloy, a Fe—Si—Ga series alloy, a Fe—Si—Ga—Ru series alloy, a Fe—Co—Si—Al series alloy and so on.

Further, in order to advance anti-corrosion and wear resistance and so on still more, at least a kind of Ti, Cr, Mn, Zr, Nb, Mo, Ta, W, Ru, Os, Rh, Ir, Re, Ni, Pd, Pt, Hf, V and so on may be added. Further, the crystal magnetic film such as Sendust containing oxygen, Sendust containing nitrogen, a Fe—Si—Ga—Ru series alloy containing oxygen, a Fe—Si—Ga—Ru series alloy may be used. Further, a Fe series micro crystal, a Co series micro crystal may be used.

As a method for forming the metallic magnetic films 3 and 4, any vacuum thin film forming technology that is represented by the vacuum evaporation method, the sputtering method, the ion plating method, the cluster ion beam method and so on are adopted.

Further, though the metallic magnetic films 3 and 4 may be monolayer films of the ferromagnetic alloy materials, they may be laminated films with many layers are laminated through middle layers such as, for example, $SiO_2$, $Ta_2O_3$, $ZrO_2$ and $Si_3NO_4$.

Further, nonmagnetic ferrite, Zirconium Oxide series Ceramics, crystal glass, nonmagnetic ferrous oxide series ceramic, Titan Acid series Ceramics such as $BaTiO_3$, $K_2TiO_3$ and so on as well as a ferrite material are used for the substrates 1 and 2.

Figure 3:
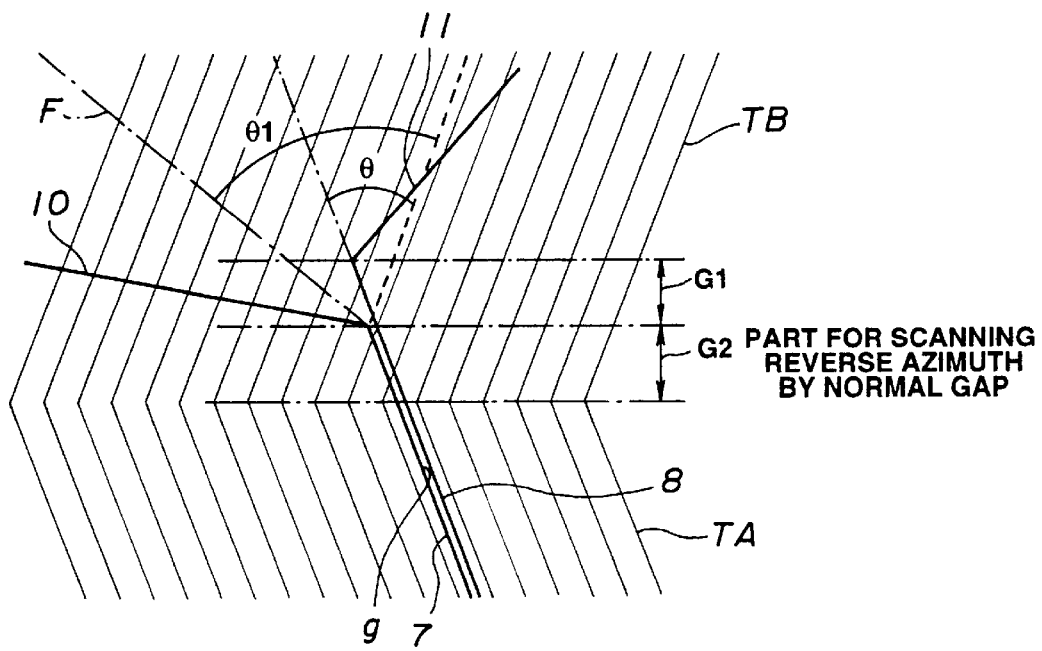
FIG. 3 is a schematic view showing circumstances during magnetic head playback of a recording pattern on a magnetic tape where displacement of a magnetic gap in the positive direction occurs.
Figure 4:
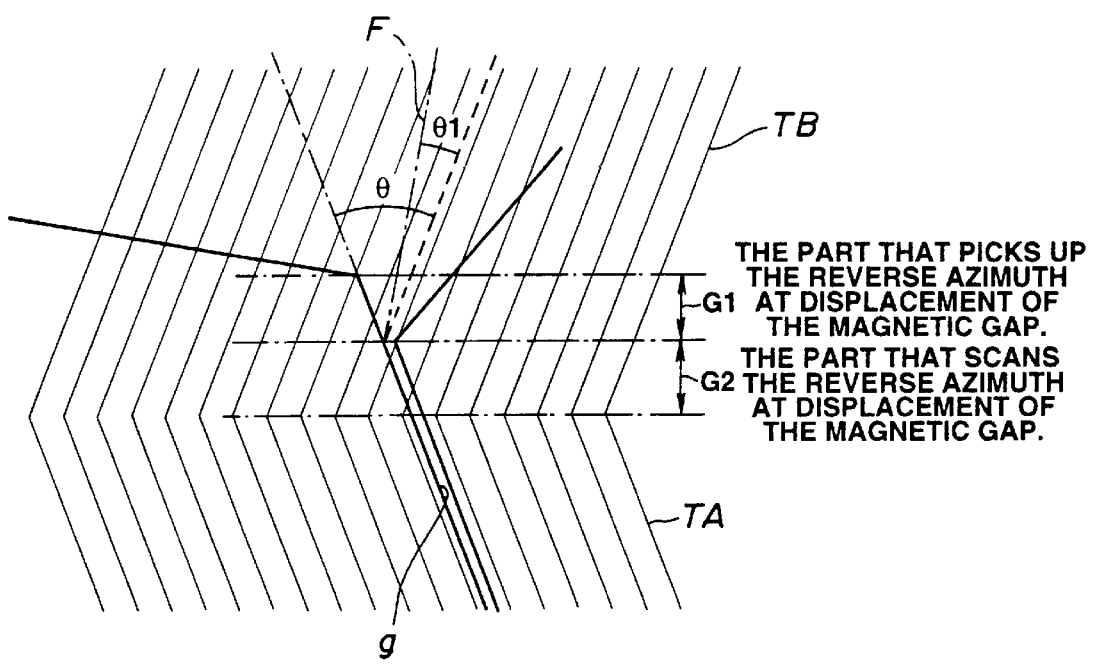
FIG. 4 is a schematic view showing circumstances during magnetic head playback of a recording pattern on a magnetic tape where displacement of a magnetic gap in the negative direction occurs.

In the magnetic head according to the present invention, as shown in FIG. 3, particularly displacement G1 in the direction of track width is given at the matching position of a projection 24A for forming the magnetic gap of each of magnetic core half bodies 5 and 6.

The displacement G1 is the displacement at an angle 01 between the center line F of the matching surface 8 of the projection 24A for forming the magnetic gap and the wall surface 10 of the track width adjusting grooves which are opposite to them and an azimuth direction of the adjacent recording track TB is larger than the angle 0 between the magnetic gap g and the azimuth direction of the adjacent recording track TB "the displacement of the magnetic gap in the positive direction").

Figure 5:
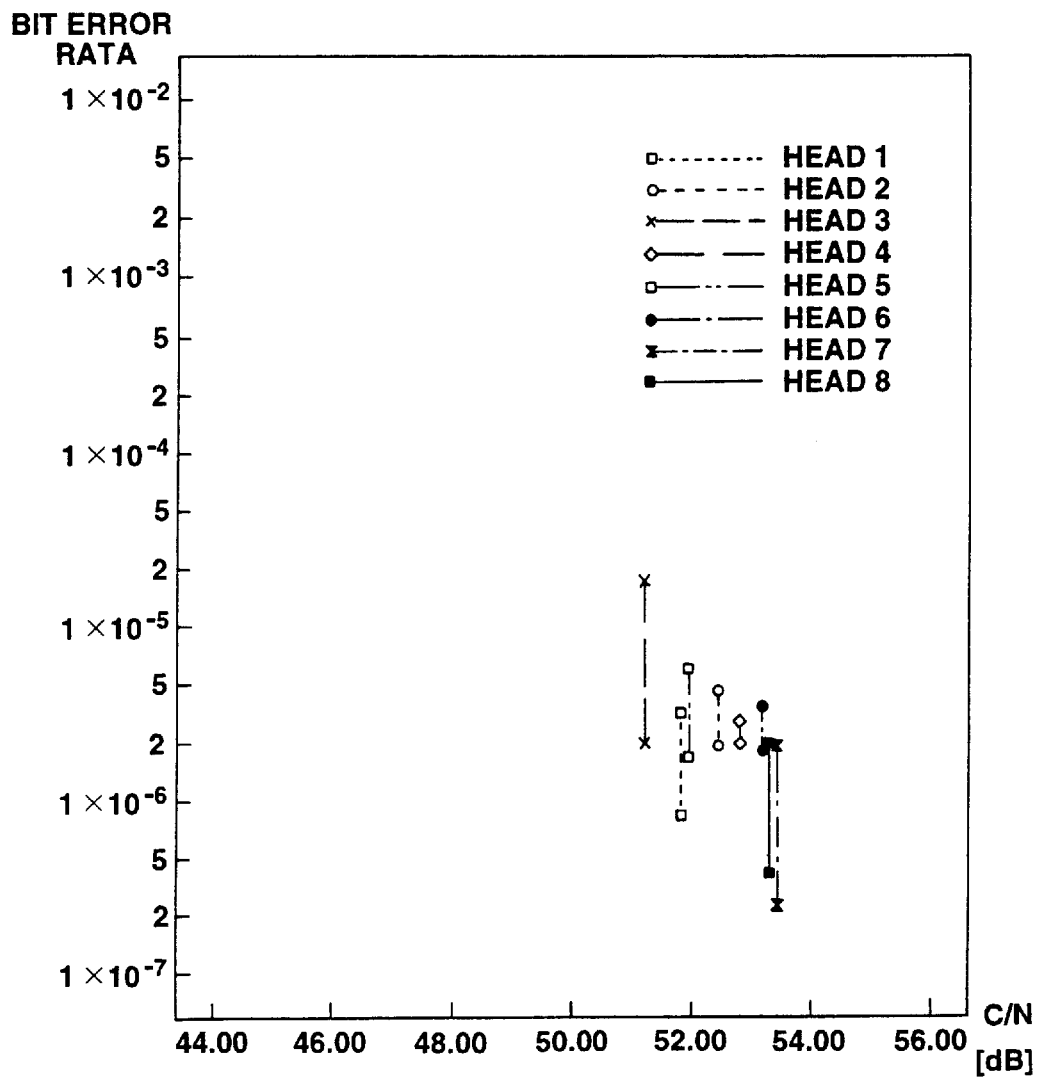
FIG. 5 is a characteristic graph showing a relation between an error rate and C/N in case of displacement of a magnetic gap in the positive direction.
Figure 6:
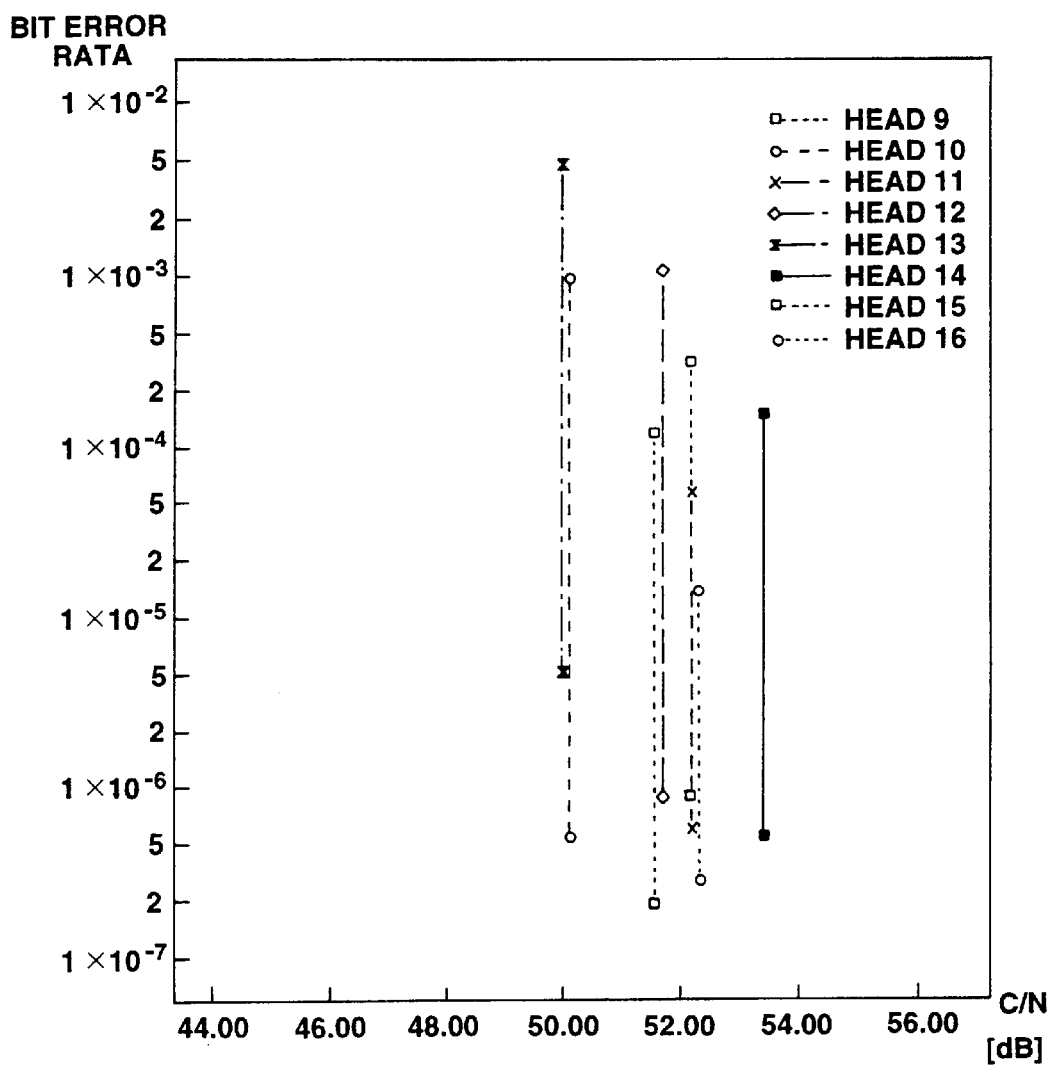
FIG. 6 is a characteristic graph showing a relation between an error rate and C/N in the case of displacement of a magnetic gap in the negative direction.

Because, as shown in FIG. 5, the amount of adjacent pattern signals which the displacement G1 of the magnetic gap picks up extremely depends on the direction of the displacement G1 of the magnetic gap. That is, because by forming the direction F of the bisector of the opening angle 0 by the displacement G1 of the magnetic gaps of the track width adjusting grooves 10 and 11 to adjust the track width To far from the angle of the azimuth record of adjacent recording track, the azimuth record of adjacent recording tracks is not effected and it is possible to reduce crosstalk from an adjacent channel.

In the present embodiment, the direction F of the bisector of the opening angle 0 by the displacement G1 of the magnetic gap g of the track width adjusting grooves 10 and 11 to adjust the track width To is formed far from the angle of the azimuth record of adjacent recording track.

Next, the method for producing the magnetic head of the present embodiment will be described.

Figure 8:
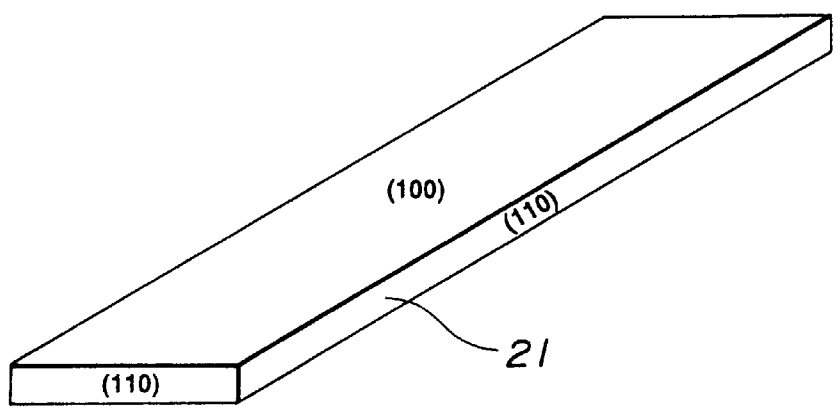
FIG. 8 is a perspective view of a substrate.

First, as shown in FIG. 8, a substrate 21 made of the ferrite material is prepared. The plane of the substrate 21 is prepared by using a plane grinder.

In the present embodiment, as the substrate 21, a monocrystal or a multi crystal of the magnetic ferrite material, a joint material of them, or a nonmagnetic material such as nonmagnetic ferrite, $BaTiO_3$, $K_2TiO_3$ and crystal glass is used.

Further, though the plane direction of the monocrystal ferrite used for the present embodiment is as shown is FIG. 8, the monocrystal, the multi crystal substrate or the joint substrate of the monocrystal and the multi crystal ferrite and so on may be used.

Figure 9:
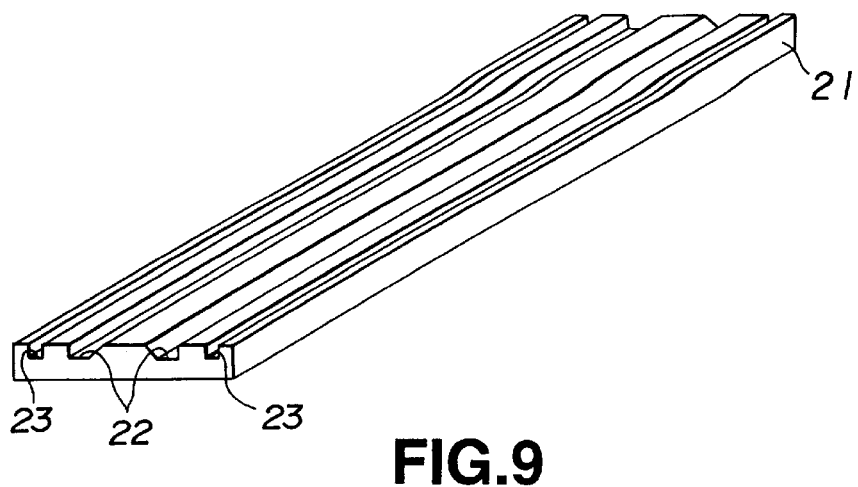
FIG. 9 is a perspective view of a substrate useful for explaining a process for forming winding grooves and glass grooves on the substrate.

Next, two winding grooves 22 and two glass grooves 23 are formed in a longitudinal direction of the substrate 21 by a slicer as shown in FIG. 9. That is to say, the winding grooves 22 and the glass grooves 23 are formed symmetrically about the center of the substrate 21 as illustrated. By forming the substrate 21 as above mentioned, a pair of magnetic core blocks 21a and 21b that are a pair of magnetic core half bodies 5 and 6 are made of the one substrate 21 (see FIG. 14).

Next, track width adjusting grooves 24 are formed at right angle to the winding grooves 22 and the glass grooves 23, that is, in the direction of the width of the substrate 21.

Then, when forming the track width adjusting groove 24, projections for adjusting positions 25A, 25B, 26A and 26B are formed by forming position adjusting grooves 25 and 26.

Here, in the width H2 of those projections 25A and 25B for adjusting positions and the width H3 of those projections 26A and 26B for adjusting positions, intervals of the matching width are different. After forming the track width adjusting grooves 24 and the position adjusting grooves 25 and 26, a mirror process is performed on the surface of the substrate 21 by polishing and so on.

At this point, the conventional track width regulating groove was formed so that all the track width regulating grooves were angled by 30 degree to the vertical directions of all the substrates and were equal.

Figure 10:
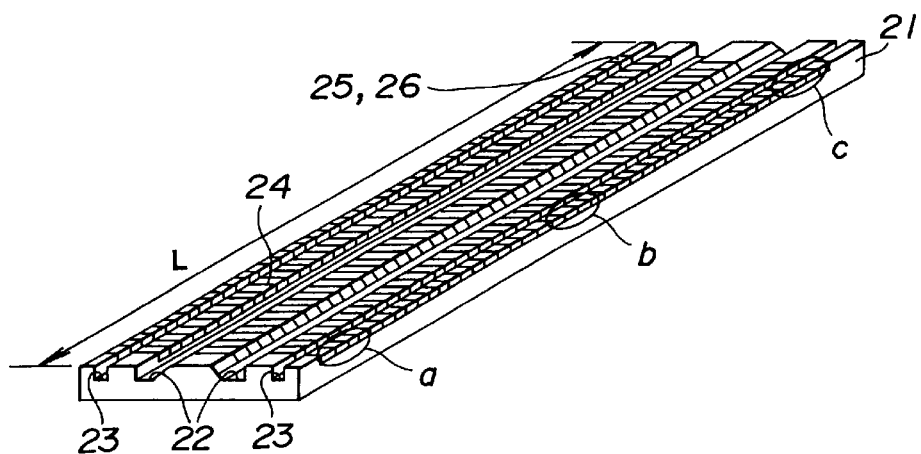
FIG. 10 is a perspective view of the substrate useful for explaining a process for forming a track width adjusting grooves and position adjusting projections on the substrate.

However, according to the present embodiment, after forming the position adjusting grooves 25 and 26 adjacent to the track width adjusting grooves 24 at both ends (shown as the numeral references (a) and (c) in FIG. 10) in the direction L of the width of the substrate. That is to say, both of side surfaces of the projections 25A, 25B, 26A and 26B for adjusting the positions are almost vertical to the surfaces for forming the track width adjusting grooves.

Thus, it is possible to match the substrates 21a and 21b which are a pair of magnetic core half bodies without being influenced by the angle for forming the track width regulating grooves 24 by forming the projections 25A, 25B, 26A and 26B for adjusting the positions.

Figure 11:
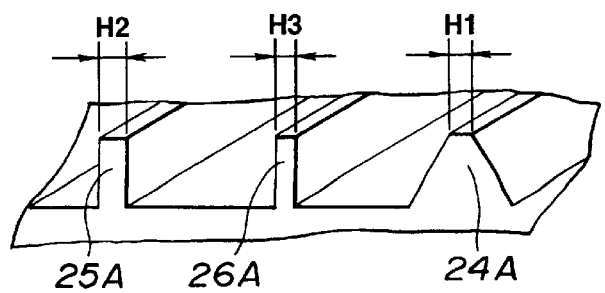
FIG. 11 is an enlarged perspective view of a part "a" of the substrate of FIG. 10 to show position adjusting grooves.
Figure 12:
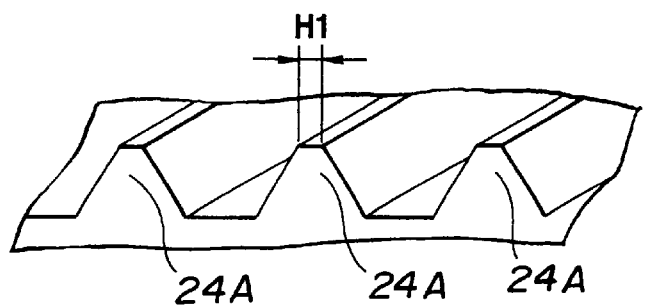
FIG. 12 is an enlarged perspective view of part "b" of the substrate of FIG. 10 to show track width and adjusting grooves.
Figure 13:
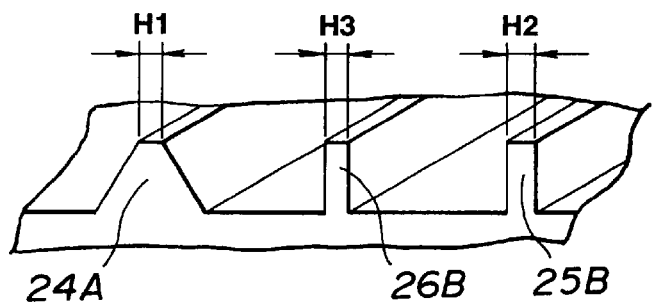
FIG. 13 is an enlarged perspective view of a part "c" of the substrate of FIG. 10 to show position adjusting grooves.

Here, in the projections 25A, 25B, 26A and 26B for adjusting the positions, as shown in FIGS. 11 through 13, are formed as the width H2 of those projections 25A and 25B is 14.5 μm, and the width H3 of those projections 26A and 26B on the side adjacent to the track width regulating groove 24 is 13 μm. It is possible to produce the magnetic head wherein the amount of displacement δ in the direction of the track width of the magnetic gap is 1.5 μm and the track width To is 11.5 μm.

Further, the width H1 of the projection 24A for the magnetic gap formed between the track width adjusting grooves 24 is formed 13 μm, similar to the width H3 of the projections 26A and 26B. Further, the inclined angle of the track width regulating groove 24 is formed 30 degree in the vertical direction of the substrate 21. However, needless to say, the present invention is not limited to this.

Still, though the position adjusting grooves 25 and 26 are vertically formed in the direction L of the width of the substrate 21 at both ends a and b of the substrate 21 in the present embodiment, it is possible to form the respective position adjusting grooves 25 and 26 as another shape, for example, V-type and so on, and it may be positioned at another part of the substrate 21.

Figure 14:
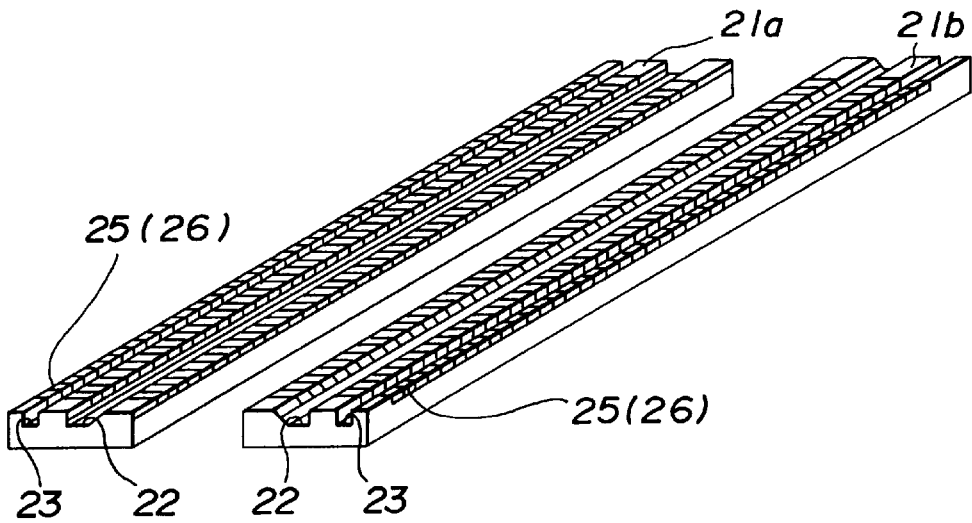
FIG. 14 is a slant view showing a process for producing the magnetic head and showing a process for cutting a substrate.

Next, as shown in FIG. 14, the separated substrates 21a and 21B are made by cutting the substrate 21 at the center.

Here, as the projections 25A, 25B, 26A and 26B for adjusting the positions as above made up as well as the winding groove 22 and the glass groove 23 are formed on one substrate 21 in the present embodiment, the projections 25A, 25B, 26A and 26B for adjusting the positions that are symmetrical each other are formed by cutting as above mentioned.

Figure 15:
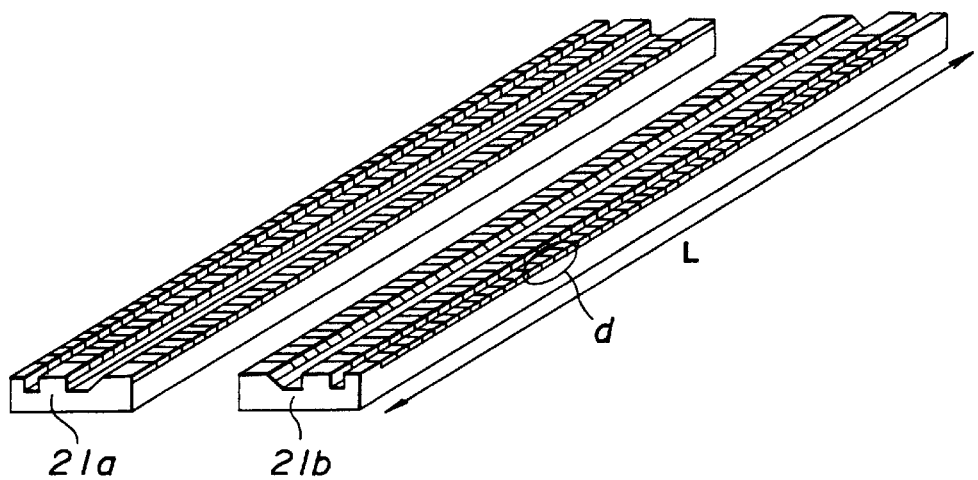
FIG. 15 is a slant view showing a process for producing the magnetic head and showing a process for making a metallic magnetic film.
Figure 16:
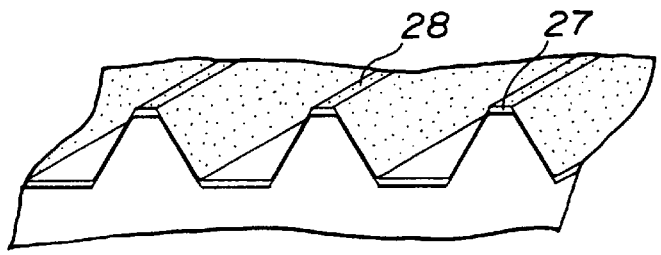
FIG. 16 is an enlarged slant view of "d" part of FIG. 15 and showing circumstances that a metallic magnetic film is made on track width adjusting grooves and a gap part.

Next, a metallic magnetic film 27 is formed by sputtering on the cut substrates 21a and 21b as shown in FIGS. 15 and 16 and a gap film 28 is formed on the metallic magnetic film 27. When forming the metallic magnetic film 27, the metallic magnetic film 27, as shown in FIG. 16, is formed including in the track width regulating groove. AS the metallic magnetic film 27, Fe—Si—Ge—Ru series alloy was used in the present embodiment.

Here, for the purpose of advancing adhesion between the substrates 21a and 21b and the metallic magnetic film 27, the oxide film such as $SiO_2$ and $Ta_2O_5$, the nitride film such as $Si_3O4$, or the metallic film and the alloy film such as Cr, Al, Si and Pt, and the laminated film with which these are combined may be used as the foundation film. In the present embodiment, the $SiO_2$ film which is 5 nm thick was used for the purpose of advancing adhesion.

Though the $SiO_2$ monolayer film was used for the gap film, the double layer film and the multi layer film provided with, for example, the Cr film and so on, on the upper layer may be used as the film for preventing reaction with the fusion glass 11.

Figure 17:
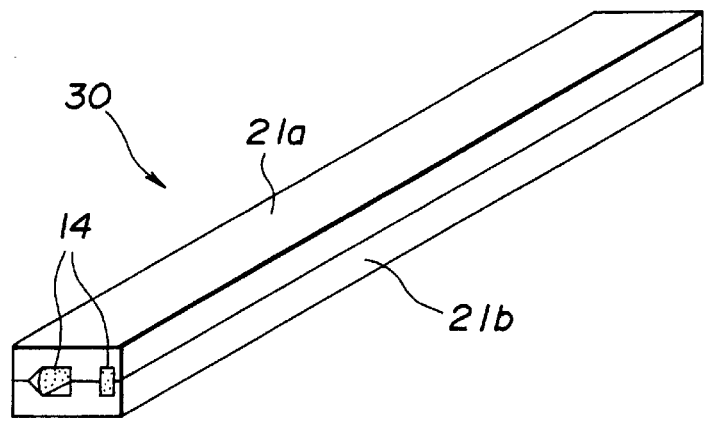
FIG. 17 is a slant view showing a process for producing the magnetic head and showing circumstances of matching and jointing cut substrates.

Next, a joint substrate 30 is made by heating from 500 to 700 degrees Celsius as applying the substrates 21a and 21d made as above mentioned and by jointing by glass 14 having the low melting point as shown in FIG. 17.

Figure 18:
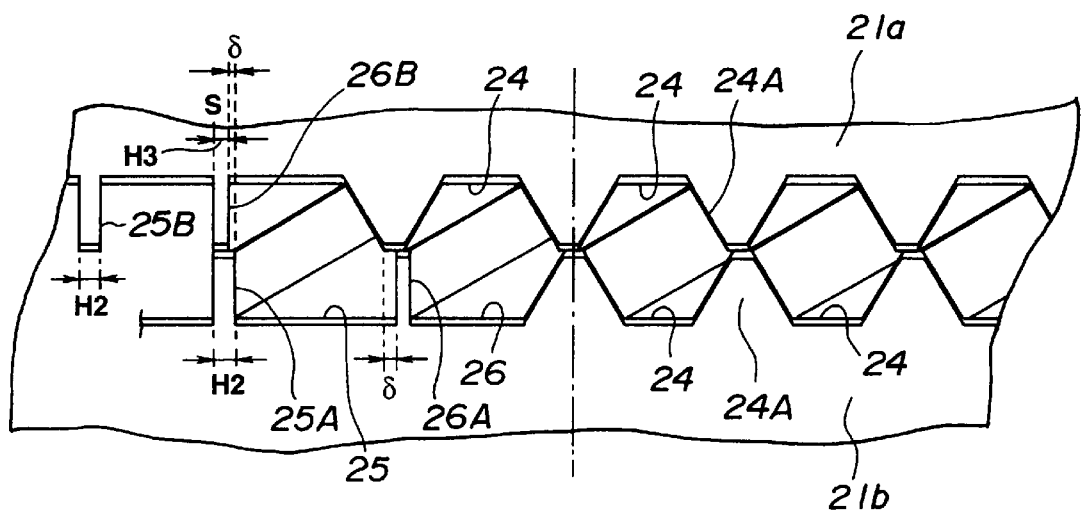
FIG. 18 is a schematic view showing a process for producing the magnetic head and showing a process for adjusting the direction that makes a magnetic gap occur displacement and matching.

Here, in jointing as above mentioned, as shown in FIG. 18, the projections 25A and 26B which have different widths H2 and H3 formed at both ends of the substrates 21a and 21b were matched so that the straight part S on one side of both of position adjusting grooves 25 and 26 is in agreement. As above mentioned, the accurate matching joint is performed occurring the constant amount of displacement δ in the direction of the track width of the magnetic gap in order from the track width regulating groove 24 on the side adjacent to the position adjusting groove 26 by matching different kinds of projections 25A and 26B. In the present embodiment, the amount of displacement δ in the direction of the track width of the magnetic gap is 1.5 μm as above mentioned.

Next, after the thickness of the joint substrate 30 is formed to the fixed one by using a plane grinder, the part of the magnetic recording media sliding surface is ground cylindrically.

Figure 19:
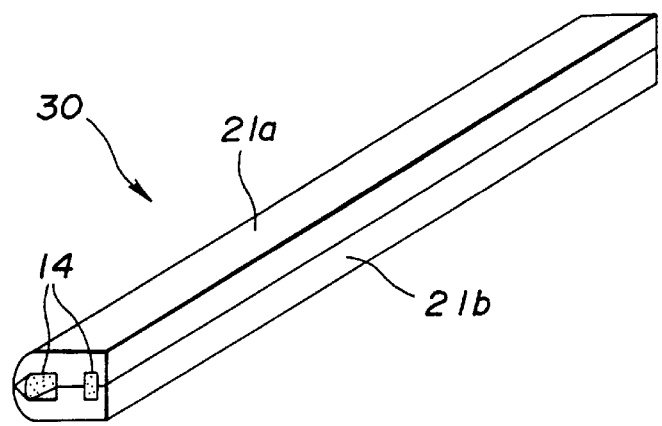
FIG. 19 is a slant view showing a process for producing the magnetic head and showing a process for cylindrically grinding a magnetic recording media sliding surface.
Figure 20:
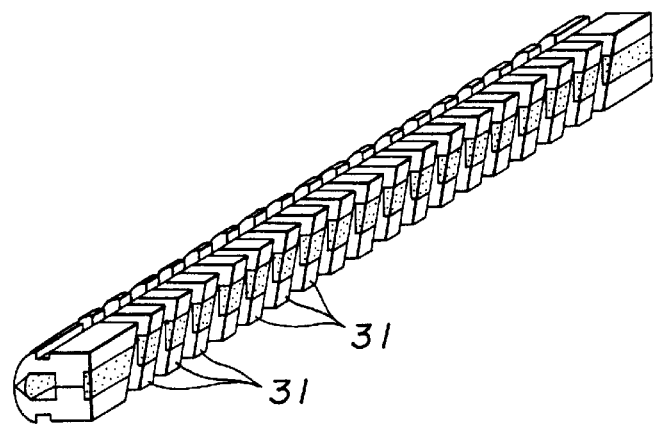
FIG. 20 is a slant view showing a process for producing the magnetic head and showing a process for cutting it to head tips having the fixed size.
Figure 21:
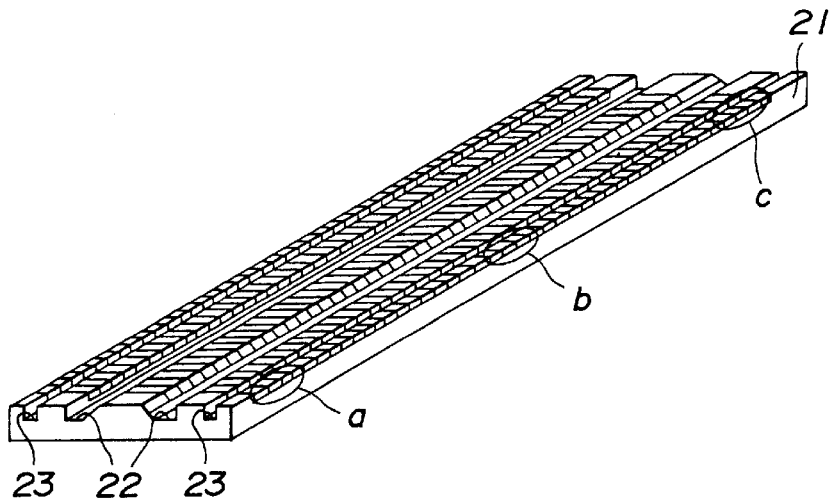
FIG. 21 is a slant view showing a process for producing the magnetic head of the second embodiment and showing a process for forming a track width adjusting grooves and position adjusting projections.
Figure 22:
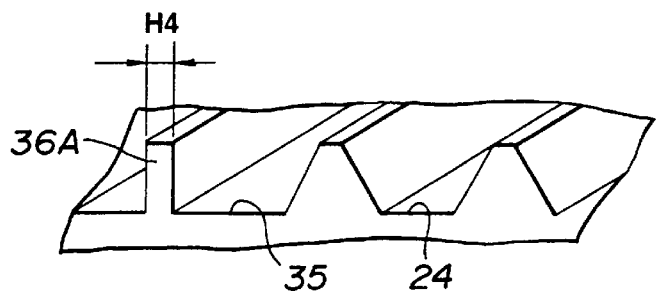
FIG. 22 is an enlarged slant view of a "a" part of FIG. 21 and shows position adjusting grooves.
Figure 23:
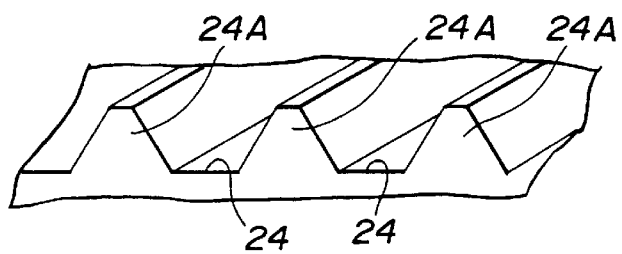
FIG. 23 is an enlarged slant view of a "b' part of FIG. 21 and shows track width adjusting grooves.
Figure 24:
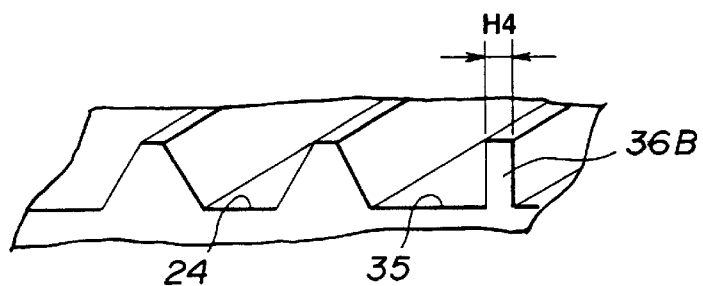
FIG. 24 is an enlarged slant view of a "c" part of FIG. 21 and shows position adjusting grooves.

Next, after executing the working width process, the process of the winding groove 22 and so on is undertaken in order to secure the working face to the magnetic recording media on the magnetic recording media sliding surface as shown in FIG. 19. A lot of head tips 31 are made by cutting at the same angle as the objective azimuth angle as shown in FIG. 20.

Though they were not made at the azimuth angles of +20 degrees and −20 degrees in cutting this time, then the azimuth angle was decided so that the displacement of the magnetic gap occurred in the direction of + as above mentioned. Thus, the magnetic head is completed as shown in FIG. 7.

The amount of displacement δ in the direction of the track width of the magnetic gap of the magnetic head made as above mentioned was measured.

As a result, through 3σ=1.5 μm in case of matching the gap by displacing in one direction in only the track width adjusting groove of the conventional magnetic head, the magnetic head produced according to the present embodiment was sharply improved to 3σ=0.7 μm.

Embodiment 2

First, the magnetic head of the present embodiment is different form the first embodiment, and the head that the projections for forming the magnetic gaps of a pair of magnetic core half bodies 5 and 6 are completely agreed to the edges of both ends.

However, the method for producing the magnetic head of the embodiment 2 is the same as that of the embodiment 1 in point of forming the position adjusting projections 36 and adjusting the positions of these position adjusting projections 36A and 36B in forming the track width adjusting grooves 24.

The projections 36 are formed in forming the track width adjusting grooves 24, as shown in FIGS. 21 through 25, after forming the winding groove 22 and the glass groove 23 in the longitudinal direction of the substrate 21 similar to the case of the embodiment 1.

That is to say, the projections 36A and 36B are formed in series to the projection 24A for forming the magnetic gap by forming the position adjusting groove 35 adjacent to the track width adjusting groove 24 at both ends (shown by the numeral references "a" and "c" in FIG. 21) in the direction L of the width of the magnetic core block.

The surfaces of the position adjusting projections 36A and 36B are vertical to the surface for forming the track width adjusting groove.

As such, position adjusting projections 36A and 36B are formed on the one substrate 21, when the substrate 21 is cut from the center, the width H4 of the projections 36A and 36B that are symmetrical with respect to each other, is the same.

Figure 25:
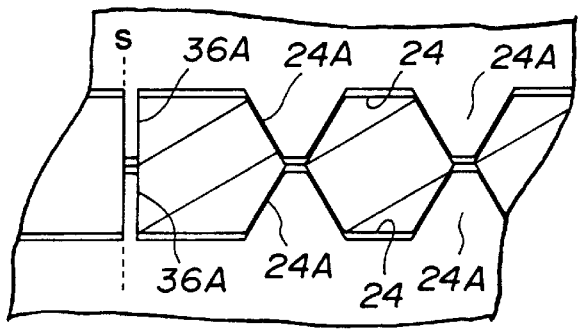
FIG. 25 is a schematic view showing a process for producing the magnetic head and showing a process for matching without occurring displacement of a magnetic gap by projections for adjusting a position.

Therefore, when the magnetic core blocks (substrates) which are a pair of the magnetic core half bodies 5 and 6 are matched to each other, as shown in FIG. 25, matching is executed as the straight part S on one side of the both side surfaces of the position adjusting projections 36A and 36B is in agreement.

When matching as mentioned above, the symmetrical position adjusting projections 36 (36 and 36B) are matched to each other, and it is possible to joint and integrate them without occurring displacement of the magnetic gap g.

Still, though the projections 36A and 36B made up as mentioned above are formed dat both ends of the substrate in the present embodiment, they may be formed at another part of the substrate 21 and at least one of a pair of the position adjusting projections 36A and 36B may be formed.

Figure 1:
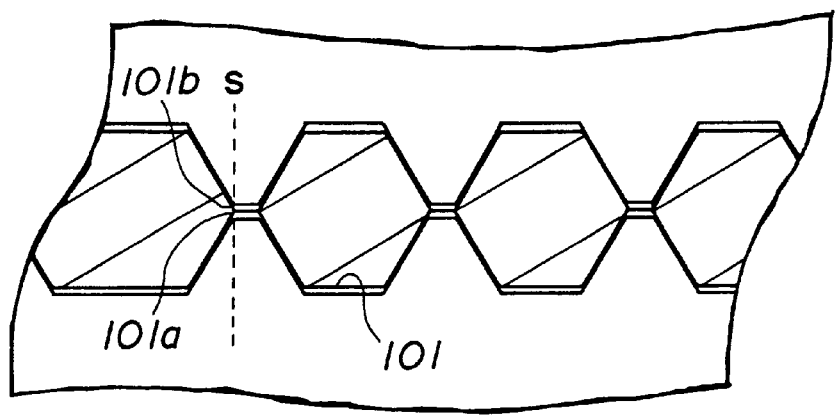
FIG. 1 shows a schematic view showing a process for producing a conventional magnetic head and showing a process for matching a pair of magnetic core blocks.
Figure 2:
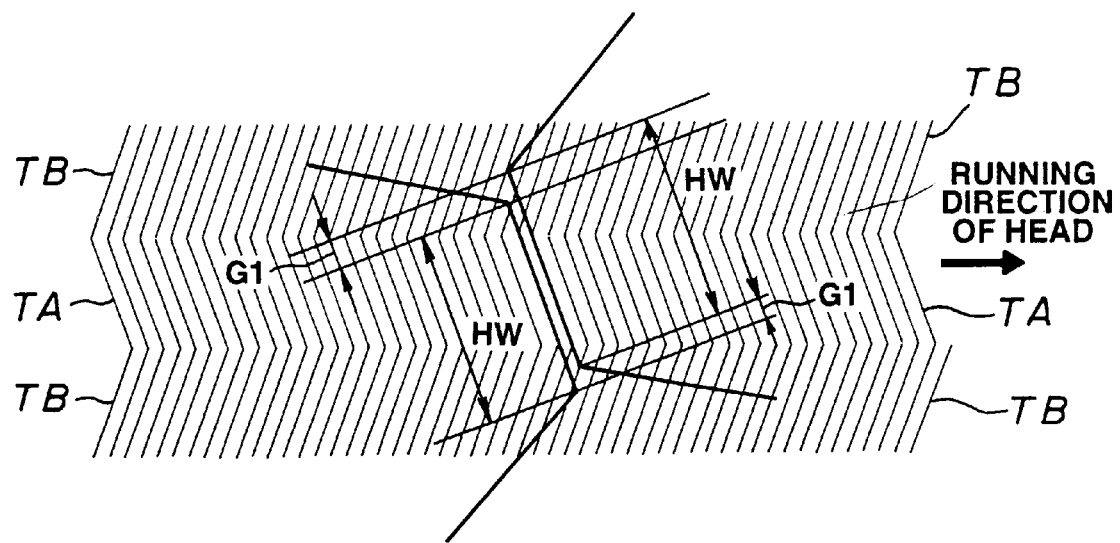
FIG. 2 is a schematic view showing circumstances during magnetic head playback of a recording pattern on a magnetic tape.

IN this point, in order to make the cross section of the core and to advance the recording and playback characteristics in the neighborhood of the magnetic gap in forming the conventional track width adjusting grooves the track width adjusting grooves were angled at 30 degrees to the vertical directions of all the substrates and all the track width adjusting grooves were formed uniform. Therefore, in matching the magnetic core blocks (substrates) each other, as shown in FIG. 1, the magnetic gap was matched only at the edges 101a and 101b of the track width adjusting groove 101. Thus, it was hard to match as the straight part S was agreed, and accuracy of matching was not good.

On the contrary, as a pair of projections 36A and 36B for matching width of which is the same are formed and the groove 35 in series to the projections 36A and 36B for matching is vertically formed to the substrate 21, it is possible to match with high accuracy without being influenced by the angle of the track width adjusting groove 24. Therefore, a magnetic head with which it is possible to control influence of adjacent stroke a little is produced. Still, as the width of a pair of projections 36A and 36B is a pair, if the same, it is not limited to the concrete numeral value.

After that, azimuth angles are added to the magnetic gap after executing cylindrical grind and so on similar to the case of the first embodiment.

Amount of displacement δ in the direction of the track width of the magnetic gap of the magnetic head made as above mentioned was measured.

As a result, though 3σ=1.5 μm in case of matching the gap by displacing in one direction in only the track width adjusting groove of the conventional magnetic head, the magnetic head produced according to the pre sent embodiment was sharply improved to 3σ=0.7 μm.

The magnetic head produced as above mentioned is the magnetic head with high accuracy that is possible to plan to advance the error rate of a playback signal.

Therefore, it is possible to obtain the sufficient error rate in video recording for a long time by a home digital VTR, and it is expected that Bitabi compounder that is a circuit that makes the error rate advance by memorizing the past judging circumstances is not necessary.

Still, though the concrete embodiments to which the present invention is applied are described, the present invention is not limited to the embodiments and is possible to variously changed. Though, for example, the metallic magnetic film is the main core in the embodiments, such film must not be formed on the magnetic core substrate and may be the magnetic head that the closed magnetic loop is made up only by the ferrite core.

Of course, it is possible to obtain the same effect as that of the former head even by the head in this case.

Further, it is possible to apply the magnetic recording and playback device using such the magnetic head is possible to apply for the digital signal accumulating device such as a data streamer as well as the home digital VTR.

As the method for producing the magnetic head according to the present invention comprises forming projections for adjusting positions both side surfaces of which are vertical to the surfaces for forming the track width adjusting grooves in forming the track width adjusting grooves and adjusting the positions of the projections for forming the magnetic gap of each of magnetic core half bodies each other by adjusting the positions of the projections for adjusting the positions, the magnetic head that is not influenced by angles forming the track width adjusting grooves, has high matching accuracy of a pair of magnetic ore half bodies and is possible to control influence of adjacent cross talk less is produced.

In the magnetic head produced as above mentioned, the error rates of the playback signal is advanced and it is possible to obtain high reliability.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method for producing a magnetic head in which first and second core halves are joined together, comprising the steps of:
   a) providing first and second substrates in which the core halves are formed;
   b) forming in each substrate a winding coil groove extending in a first direction;
   c) forming in each substrate a glass filling groove also extending in said first direction parallel to said winding coil groove;
   d) forming in each substrate track width adjusting grooves extending in a second direction perpendicular to said first direction said track width adjusting grooves defining therebetween a width of the resulting head gap, said track width adjusting grooves being separated by a track width adjusting projection, said track width adjusting projection having oppositely facing sloped side walls which slope toward an apex having a thickness of at least $H_1$ at a gap width forming surface thereof;
   e) forming in each substrate first and second position adjusting grooves in said second direction adjacent to one of said track width adjusting grooves, said first position adjusting groove being defined on one side by said track width adjusting projection separating said first position adjusting groove from said one track width adjusting groove and on another side by a first position adjusting projection having vertical side walls and a thickness $H_3$, said second position adjusting groove being defined on one side by said first position adjusting projection and on another side by a second position adjusting projection having vertical side walls and a thickness $H_2$;
   f) joining together said substrates such that said glass filling grooves and winding coils are in registry and such that said first position adjusting groove in the first substrate is aligned with one of said track width adjusting grooves in the second substrate and said second position adjusting groove in the first substrate is aligned said first position adjusting groove in the second substrate and so that said first position adjusting projection in the first substrate is in alignment with said track width adjusting projections of the second substrate and said second position adjusting projection in the first substrate is in alignment with the first position adjusting projection of the second substrate.

2. The method of claim 1, comprising the steps of: adding displacement so that in adding azimuth angles to the magnetic gap, an angle between the center line of the matching surfaces of the track with the adjusting projections for forming the magnetic gap and the wall surfaces of the track width adjusting grooves which are opposite to them and an azimuth direction of the adjacent recording track is larger than an angle between the magnetic gap and the said azimuth direction of the adjacent recording track.

3. The method of claim 1, wherein $H_2 > H_3$.

4. The method of claim 1, wherein $H_1$ is substantially the same as $H_3$.

5. The method of claim 1, comprising the step of forming a metal magnetic film on said track width adjusting projections prior to joining together said first and second substrates.

6. The method of claim 1, wherein the side walls of said track width adjusting projections are sloped by 30°.

* * * * *